(12) United States Patent
Nelson et al.

(10) Patent No.: US 7,059,675 B2
(45) Date of Patent: Jun. 13, 2006

(54) MOTION CONTROLLING PLATE FOR SEAT AND SEAT SYSTEM FOR A MOBILE VEHICLE

(75) Inventors: Erik K. Nelson, Woodburn, IN (US); Thomas R. Graham, Fort Wayne, IN (US); Patrick J. Mattes, Yoder, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 11/050,961

(22) Filed: Feb. 4, 2005

(65) Prior Publication Data
US 2005/0206205 A1  Sep. 22, 2005

Related U.S. Application Data

(60) Provisional application No. 60/547,749, filed on Feb. 25, 2004.

(51) Int. Cl.
*B60N 2/42* (2006.01)
(52) U.S. Cl. ............... 297/216.14; 297/216.1; 297/216.13
(58) Field of Classification Search ............. 297/216.1, 297/216.13, 216.14
See application file for complete search history.

(56) References Cited

U.S. PATENT DOCUMENTS

| | | | |
|---|---|---|---|
| 3,734,562 A * | 5/1973 | Fourrey | 297/216.19 |
| 4,145,081 A * | 3/1979 | Withers | 297/216.14 |
| 4,784,352 A | 11/1988 | Smith et al. | |
| 5,246,271 A * | 9/1993 | Boisset | 297/362.13 |
| 5,468,044 A * | 11/1995 | Coman | 297/216.11 |
| 5,468,045 A * | 11/1995 | Weber | 297/216.11 |
| 5,507,555 A * | 4/1996 | Kiguchi | 297/216.14 |
| 5,697,478 A * | 12/1997 | Di Stefano | 297/216.1 |
| 5,882,072 A * | 3/1999 | Morlock | 297/216.13 |
| 6,123,388 A | 9/2000 | Vits et al. | |
| 6,485,098 B1 | 11/2002 | Vits et al. | |
| 6,554,356 B1 * | 4/2003 | Crose | 297/216.13 |

* cited by examiner

*Primary Examiner*—Peter R. Brown
(74) *Attorney, Agent, or Firm*—Jeffrey P. Calfa; Dennis Kelly Sullivan; Susan L. Lukasik

(57) ABSTRACT

The invention involves a two-piece seat for a passenger-carrying vehicle with the seat being capable of complying with the federal requirements with reduced complexity. A steel plate is rigidly attached to the rotating seat back. The steel plate will prevent the seat back from rotating during normal use. If the bus were in a collision, a belted occupant would apply load to the rotating seat back through the seat belts. The steel plate would deform, allowing the rotating seat back to come forward. The fixed portion of the seat back remains in position to act as a passive restraint for any passengers seated behind this particular seat. Utilizing deformable steel plates to retain and control the operation of a rotating seat back equipped with 3-point restraints is a unique aspect to this invention. The plates will retain the rotating seat back in normal use to prevent vandalism to the seat belts, and can be easily removed so the seat back can be rotated forward for servicing the seat belts and upholstery covers.

6 Claims, 3 Drawing Sheets

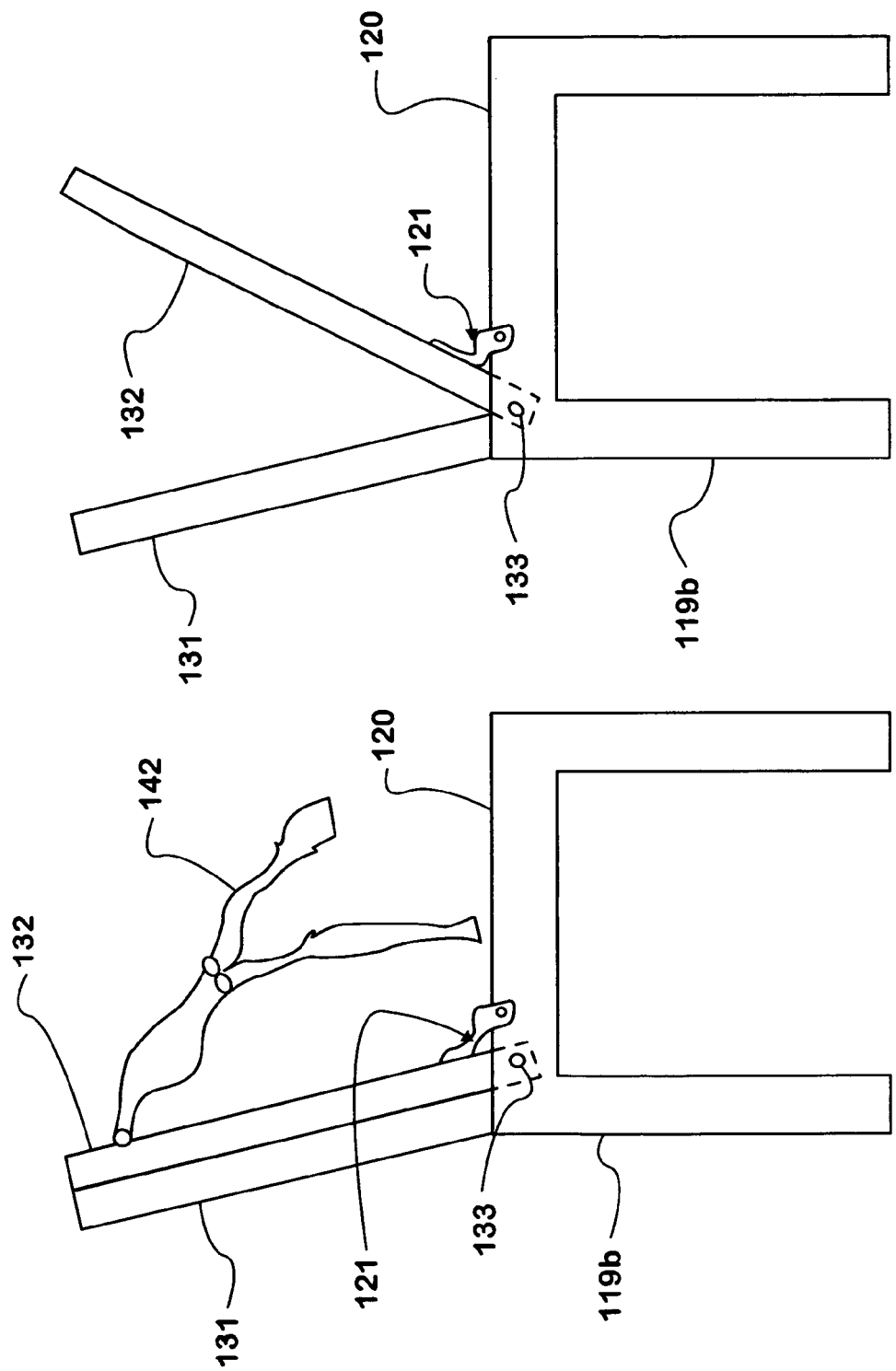

MOTION CONTROLLING PLATE FOR SEAT AND SEAT SYSTEM FOR A MOBILE VEHICLE

This patent issued from a non-provisional patent application claiming the priority of provisional patent application Ser. No. 60/547,749, filed Feb. 25, 2004.

BACKGROUND

Automotive vehicles have had three point seat belt systems that combine a lap belt and an upper torso belt for some time now. The tongue may be swung across the person and engaged with a buckle affixed to the seat thereby positioning one portion of the belt across the lap and another portion of the belt across the upper torso.

Designers of school buses face a conundrum in including three point seat belts in buses in that the requirements involved with installing a three-point seat belt may act in conflict with the requirements for passive restraints. The U.S. federal government requirement for passive restraints requires that the rear side of the seat provide an impact barrier in which the seat back bends or deforms when subjected to the force of occupants impacting the rear side in a deceleration event. The National Highway Traffic Safety Administration, DOT (NHTSA), sets the federal requirements for these passive restraints. These are codified as 49 C.F.R. Section 571.222 (FMVSS 222).

The code specifies a passive restraint system, and does not require any sort of active restraints such as a two-point passenger restraining lap belt or a three-point passenger restraining lap belt and torso harness combination. The passive restraint requirement effectively provides a compartment in which an unbuckled passenger is constrained during a rapid deceleration of the bus. Although two point belt systems are offered on buses, designers need to consider three-point seat belts where there is a request for them through local, state, or transportation/parental action groups. Three point seat belt designs are also regulated under NHTSA code. These requirements relate to belts that are mounted in such a fashion that they inhibit a belted passengers forward movement. This three-point belt-mounting requirement is codified in 49 C.F.R. Sections 571.209 and 571.210 (FMVSS 209 and FMVSS 210).

The design conundrum results from the fact that tests have shown that in a rapid deceleration where the passenger in the front seat is buckled and the passenger in the rear seat is not, the initial action is that the buckled passenger moves forward applying tension on the buckled seat belt and the component the belt is affixed to. This results in a pulling of the fixture component in a forward direction thereby reducing the strength on the rear impact face for the unbuckled passenger behind the seat in question. Following the tension applied on the three-point belt, the rear passenger would be expected to contact the seat back. The reduction in seat back strength due to the pull on the three-point seat belt for FMVSS 210 requirement may reduce the ability of the seat back to meet the FMVSS 222 requirements. Recent school bus seat designs have been developed that involve a movable inner seat for the mounting of the three point seat belts and an immovable seat back portion for the absorption of the rear unbuckled passenger loads. The movable inner seat was inserted into a recess within the immovable seat back. The immovable seat back would be designed to deform in order to comply with FMVSS 222. One of these designs was disclosed in U.S. Pat. Nos. 6,123,388, and 6,485,098. The concept of a seat inserted within a seat was not new to this bus seat. That concept was disclosed in U.S. Pat. No. 4,784,352. One problem with this prior art was the complexity of the mechanism to stop the movable inner seat.

SUMMARY

The invention involves a two-piece seat capable of complying with the federal requirements with reduced complexity. A steel plate is rigidly attached to the rotating seat back. In option 1, the steel plate is also rigidly attached to a fixed portion of the seat. In option 2, the steel plate rests against a rigid part of the fixed portion of the seat. The steel plate will prevent the seat back from rotating during normal use. If the bus were in a collision, a belted occupant would apply load to the rotating seat back through the seat belts. The steel plate would deform, allowing the rotating seat back to come forward. The fixed portion of the seat back remains in position to act as a passive restraint for any passengers seated behind this particular seat. Utilizing deformable steel plates to retain and control the operation of a rotating seat back equipped with 3-point restraints is a unique aspect to this invention. The plates will retain the rotating seat back in normal use to prevent vandalism to the seat belts, and can be easily removed so the seat back can be rotated forward for servicing the seat belts and upholstery covers.

DRAWINGS

Other objects and advantages of the invention will become more apparent upon perusal of the detailed description thereof and upon inspection of the drawings, in which:

FIG. 4a is a side view of a seat made in accordance with the invention in a pre-accident condition.

FIG. 4b is a side view of the seat of FIG. 4a in a post accident condition.

DESCRIPTION OF INVENTION

Figure 1:
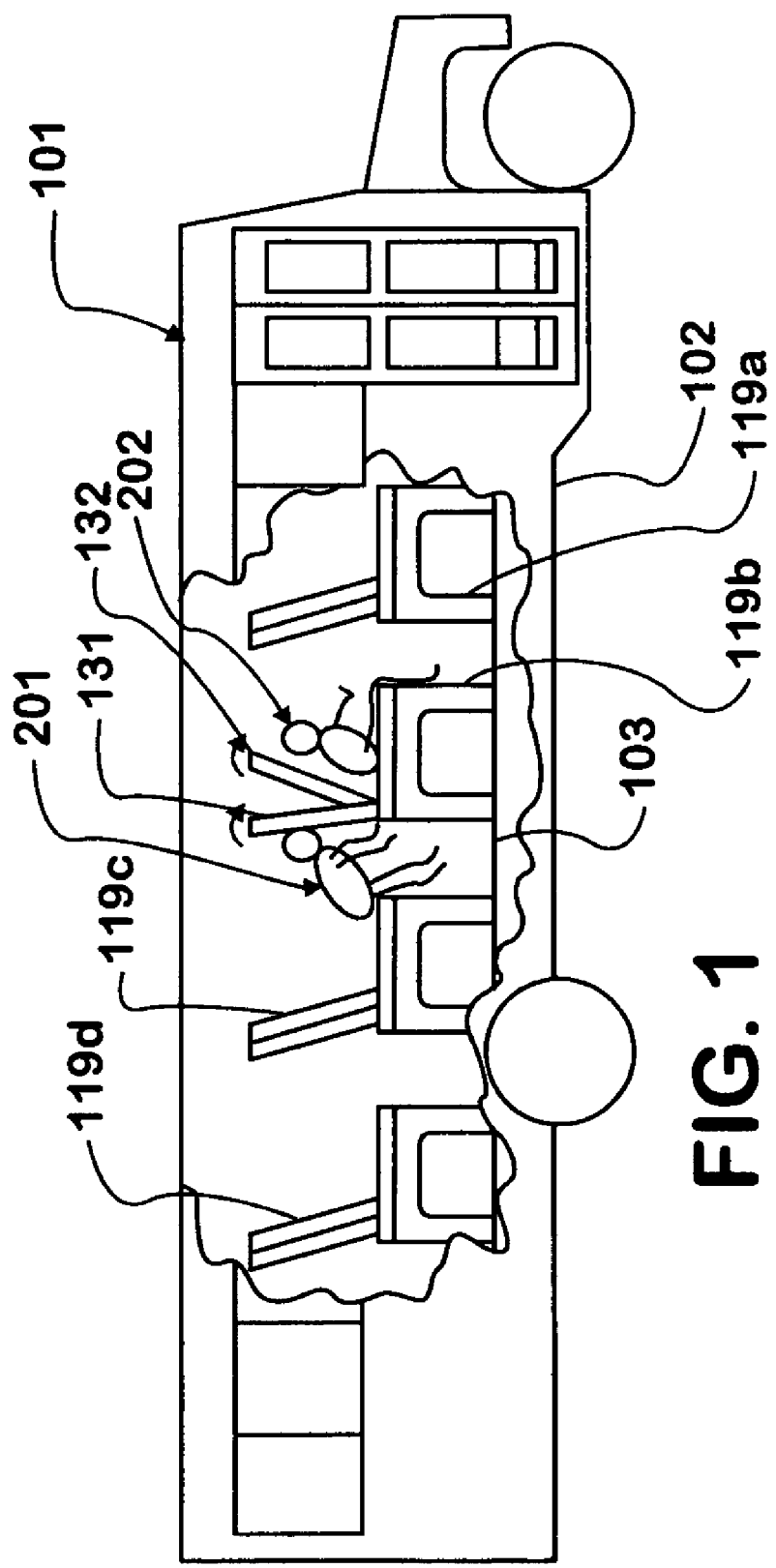
FIG. 1 is a cutaway view of a vehicle using an embodiment of the seat and motion controlling plate sub-system made in accordance with this invention.
Figure 2:
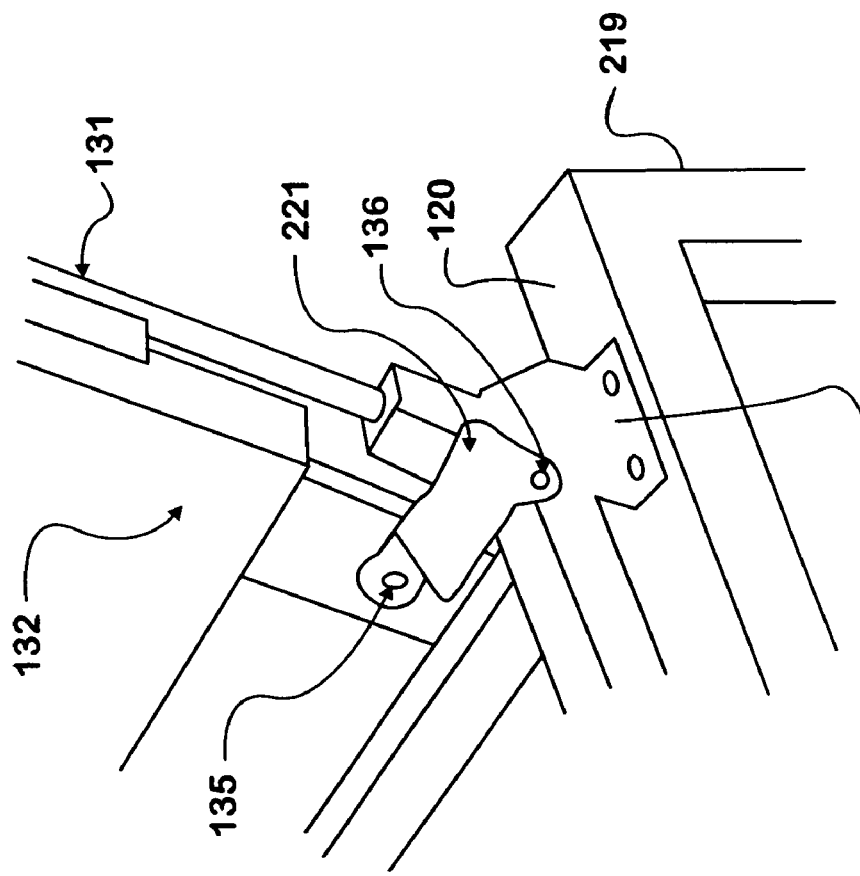
FIG. 2 is a view of one embodiment of a motion controlling plate sub-system for use with the vehicle shown in FIG. 1.

A motor vehicle 101 includes a passenger carrying body 102. The vehicle 101 may be a school bus. The body 102 includes a mounting floor 103 for the mounting and placement of passenger seating. The vehicle 101 shown in FIG. 1 has a series of passenger seats 119a, 119b, 119c, and 119d installed on the mounting floor 103 of the vehicle body 102 arranged from the front of the vehicle to the back. A rearward passenger 201 may sit in seat 119c and a frontward passenger 202 may sit in seat 119b in front of rearward passenger 201. The first embodiment passenger seat with integrated passenger restraints 119 has a movable front frame 132 that a seat occupant rests his or her back against normally. The front frame 132 is mounted to a seat frame 120 as shown in FIG. 2. The front frame 132 is the mounting point for the upper portion of a three-point seat belt 142 as shown in FIG. 4a. The seat frame 120 is mountable to the bus body 102 mounting surface 103. The seat frame 120 contains a rear frame 131 to protect a passenger of rearward seat from moving out of his safety zone in a forward direction in the event of a rapid deceleration. This is shown in FIG. 1 that shows a rapid deceleration condition. The passenger 202 in seat 119b is buckled to the seat. The passenger 201 in the rearward seat 119c is not buckled. The passenger 201 is contained within the area between the rear frame of seat 119b and the front of seat 119c.

The vehicle has a two-piece seat capable of complying with the federal requirements with reduced complexity. The front frame 132 is movable relative to the seat frame 120. In the embodiment shown in FIGS. 4a and 4b, the front frame 132 is rotatable about the seat frame 120 about a shaft or pivoting mechanism 133 that is at least partially engaged to the seat frame 120. A steel or other bendable metal sacrificial stop plate 121 is rigidly attached to the rotating seat back 132. In FIG. 4a, the seat 119b is shown in a pre-activation or rest mode. The movable front frame 132 is roughly parallel and in contact with the immovable rear frame 131. The sacrificial stop plate 121 holds the movable front frame 132 in position. In FIG. 4b, the seat 119b is shown in a post-activation or post-event condition. The movable front frame 132 has moved forward due to the pull of a passenger held with seat belt 142. The force of the passenger on the belt 142 has pulled the movable seat back 132 forward against the resistance of the sacrificial stop plate 121. The sacrificial stop plate 121 has bent or deformed in absorbing the passenger forward movement induced force. The sacrificial stop plate 121 eventually reaches a maximum deformed state at which time the movable seat back 132 comes to rest. The movement of the movable or front seat back 132 away from the rear frame 131 leaves the rear frame 131 intact to absorb the force from an unbelted passenger in the seat behind seat 119b.

In one embodiment shown in FIG. 2, a sacrificial stop plate 221, made in accordance with the invention is also rigidly attached to a fixed portion of the seat 219. In the view shown, the seat frame 120 of the seat 219 has a rear frame 131 mounting bracket 134 that is affixed to the seat frame 120. The sacrificial stop plate 221 is affixed to both the movable seat frame 132 through fastener 135 and to the rear frame-mounting bracket 134 through fastener 136.

Figure 3:
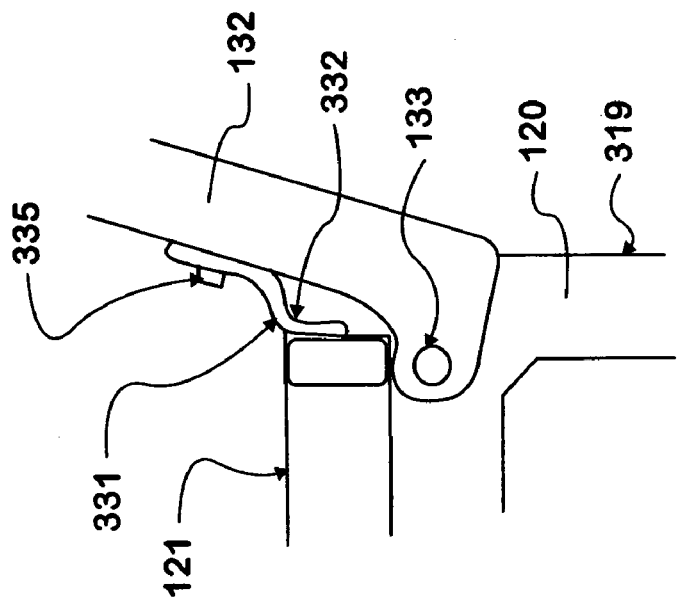
FIG. 3 is a view of a second embodiment of a motion controlling plate sub-system for use with the vehicle shown in FIG. 1.

In a second embodiment shown in FIG. 3, a sacrificial stop plate 331, made in accordance with the invention, rests against a rigid part of the fixed portion of a seat 319. In the view shown, the seat frame 120 of the seat 319 has a horizontal seat base 121 that may provide vertical support for a passenger. The seat base 121 is mounted above the seat frame 120 and forward of a movable seat frame 132. The movable seat frame 132 moves relative to the seat frame 120 about pivot mechanism 133 that is engaged between the movable seat frame 132 and the seat frame 120 at a point below an end of the seat base 121. The sacrificial stop plate 331 is affixed to the movable seat frame through a fastener 335. The sacrificial stop plate 331 has an 'S' shaped bend 332, a distal portion of the S bend being in contact but not affixed to an end of the seat base 121. Upon an activation event of the seat causing the movable seat frame 132 to move about the pivot mechanism 133, the sacrificial stop plate 331 absorbs the energy of the passenger induced movement of the movable seat frame 132 by a straightening of the S bend 332 of the plate 331. The sacrificial stop plate 331 comes in friction like contact with the seat base 121 during activation, with the S bend 332 absorbing energy as it bends. The location of the pivot mechanism 133 results in the movable seat back 132 eventually coming to rest as the movable seat back 132 sandwiches the stop plate 331 between a front face of the movable seat back 132 and a portion of the seat base 121. The movable seat back 132 eventually is arrested indirectly against the seat base 121 hence arresting a passenger's forward movement against a seat belt.

The sacrificial stop plate will prevent the seat back from rotating during normal use. If the bus were in a collision, a belted occupant would apply load to the rotating seat back through the seat belts. The sacrificial stop plate would deform, allowing the rotating seat back to come forward. The fixed portion of the seat back remains in position to act as a passive restraint for any passengers seated behind this particular seat. Utilizing deformable steel plates to retain and control the operation of a rotating seat back equipped with 3-point restraints is a unique aspect to this invention. The plates will retain the rotating seat back in normal use to prevent vandalism to the seat belts, and can be easily removed so the seat back can be rotated forward for servicing the seat belts and upholstery covers.

As described above, the seat system with motion control or sacrificial stop plate and vehicle made with the seat system of this invention provide a number of advantages, some of which have been described above and others of which are inherent in the invention. Also modifications may be proposed to the seat system with motion control or sacrificial stop plate and vehicle made with the seat system of this invention without departing from the teachings herein.

We claim:

1. A passenger seat for a multi-passenger motor vehicle, the vehicle having a body with a seat mounting surface, comprising:

a seat frame, mountable to the seat mounting surface;

an immovable rear seat frame engaged to said seat frame, said rear seat frame providing an obstruction to protect a passenger of a vehicle rearward seat from moving out his safety zone in a forward direction in the event of a vehicle rapid deceleration;

a movable front frame, pivotally engaged to said seat frame forward of said immovable rear seat frame, said movable front frame providing a back resting surface for a passenger;

a three point seat belt, an upper portion of said seat belt being engaged to an upper portion of said movable front frame, said seat belt causing a pivoting force upon said movable front frame during an activation event;

a sacrificial stop plate rigidly engaged to said movable front frame, said sacrificial stop plate holding said movable front frame from moving during normal use and said sacrificial stop plate being deformable for allowing movement of said movable front frame and absorbing energy from said movable front frame, the energy being induced from passenger forward movement in an accident condition, said sacrificial front frame having a maximum deformation with said movable front frame reaching maximum pivoting relative to said seat frame and said immovable rear seat frame upon said sacrificial stop plate reaching said maximum deformation; and said sacrificial stop plate resting against and not affixed to rigid part of the fixed portion of said seat frame.

2. The passenger seat for a multi-passenger motor vehicle of claim 1, wherein:

said seat frame having a horizontal seat base providing vertical support for a passenger;

said seat base being mounted above said seat frame and forward of said movable front frame;

said movable front frame being movable relative to said frame about a pivot mechanism engaged between said movable front frame and said seat frame at a location below an end of said seat base;

said sacrificial stop plate having an 'S' shaped bend, a distal portion of said S bend being in contact but not affixed to an end of said seat base; and said S bend acting to absorb energy in at least partially straightening upon an activation event of said seat causing said movable front frame to move about said pivot mechanism, the movement being induced by passenger forward movement from a rapid deceleration of the vehicle.

3. The passenger seat for a multi-passenger motor vehicle of claim 2, wherein:

said location of said pivot mechanism relative to said movable front frame, said seat frame, and said seat base resulting in said movable front frame having a final stopping point indirectly against said seat base hence arresting a passenger's forward movement against said seat belt.

4. A multi-passenger motor vehicle, comprising:

a body with a seat mounting surface;

at least two passenger seats, one said passenger seat having seat frame, mountable to said seat mounting surface;

an immovable rear seat frame engaged to said seat frame, said rear seat frame providing an obstruction to protect a passenger of a vehicle rearward seat from moving out of his safety zone in a forward direction in the event of a vehicle rapid deceleration;

a movable front frame, pivotally engaged to said seat frame forward of said immovable rear seat frame, said movable front frame providing a back resting surface for a passenger;

a three point seat belt, an upper portion of said seat belt being engaged to an upper portion of said movable front frame, said seat belt causing a pivoting force upon said movable front frame during a rapid deceleration activation event;

a metal sacrificial stop plate rigidly engaged to said movable front frame, said sacrificial stop plate holding said movable front frame from moving during normal use and said sacrificial stop plate being deformable for allowing movement of said movable front frame and absorbing energy from said movable front frame, the energy being induced from passenger forward movement in an activation condition, said sacrificial front frame having a maximum deformation with said movable front frame reaching maximum pivoting relative to said seat frame and said immovable rear seat frame upon said sacrificial stop plate reaching said maximum deformation; and said sacrificial stop plate resting against and not affixed to rigid part of the fixed portion of said seat frame.

5. The passenger seat for a multi-passenger motor vehicle of claim 4, wherein:

said seat frame having a horizontal seat base providing vertical support for a passenger;

said seat base being mounted above said seat frame and forward of said movable front frame;

said movable front frame being movable relative to said seat frame about a pivot mechanism engaged between said movable front frame and said seat frame at a location below an end of said seat base;

said sacrificial stop plate having an 'S' shaped bend, a distal portion of said S bend being in contact but not affixed to an end of said seat base; and said S bend acting to absorb energy in at least partially straightening upon an activation event of said seat causing said movable front frame to move about said pivot mechanism, the movement being induced by passenger forward movement from a rapid deceleration of the vehicle.

6. The passenger seat for a multi-passenger motor vehicle of claim 5, wherein:

said location of said pivot mechanism relative to said movable front frame, said seat frame, and said seat base resulting in said movable front frame having a final stopping point indirectly against said seat base hence arresting a passenger's forward movement against said seat belt.

* * * * *